United States Patent
Hauer et al.

(10) Patent No.: US 12,510,899 B2
(45) Date of Patent: Dec. 30, 2025

(54) METHOD FOR OPERATING A PLANAR MOTOR

(71) Applicant: B&R INDUSTRIAL AUTOMATION GMBH, Eggelsberg (AT)

(72) Inventors: Michael Hauer, Eggelsberg (AT); Stefan Flixeder, Eggelsberg (AT)

(73) Assignee: ABB Schweiz AG, Baden (CH)

( * ) Notice: Subject to any disclaimer, the term of this patent is extended or adjusted under 35 U.S.C. 154(b) by 538 days.

(21) Appl. No.: 18/077,710

(22) Filed: Dec. 8, 2022

(65) Prior Publication Data

US 2023/0185312 A1 Jun. 15, 2023

(30) Foreign Application Priority Data

Dec. 9, 2021 (AT) .............................. A 50984/2021

(51) Int. Cl.
| | |
|---|---|
| *G05D 1/00* | (2024.01) |
| *B65G 54/02* | (2006.01) |
| *H02K 41/03* | (2006.01) |

(52) U.S. Cl.
CPC ........... *G05D 1/0289* (2013.01); *B65G 54/02* (2013.01); *G05D 1/0291* (2013.01); *H02K 41/031* (2013.01); *H02K 2201/18* (2013.01)

(58) Field of Classification Search
CPC .... G05D 1/0289; G05D 1/0088; B65G 54/02; B66F 9/063; H02K 41/031
See application file for complete search history.

(56) References Cited

U.S. PATENT DOCUMENTS

| | | |
|---|---|---|
| 4,890,241 A | 12/1989 | Hoffman et al. |
| 10,926,418 B2 | 2/2021 | Lu et al. |

| | | |
|---|---|---|
| 2016/0341751 A1 | 11/2016 | Huber et al. |
| 2020/0030995 A1 | 1/2020 | Lu et al. |
| 2021/0221008 A1 | 7/2021 | Lu et al. |

(Continued)

FOREIGN PATENT DOCUMENTS

| | | |
|---|---|---|
| DE | 10 2018 129 727 | 5/2020 |
| DE | 10 2018 129 732 | 5/2020 |

(Continued)

OTHER PUBLICATIONS

Europe Search Report/Office Action conducted in counterparet Europe Appln. No. EP 22 21 1855 (May 2, 2023).

(Continued)

*Primary Examiner* — Gene O Crawford

(74) *Attorney, Agent, or Firm* — GREENBLUM & BERNSTEIN, P.L.C.

(57) ABSTRACT

To reduce the risk of collisions of transport units or of a transport unit with an obstacle in the movement plane in a planar motor, at least two movement paths in the movement plane are expanded two-dimensionally around the respective movement path, at least in sections, to form a movement route in the movement plane. A conflict zone, in which there is a risk of collision, is determined by checking, whether there is any overlap between the at least two movement routes, in either individual movement route or between a movement route and an obstacle. The determined conflict zone is taken into account when controlling the movement of the transport units along the assigned movement path in order to avoid collisions between transport units moving on movement routes involved in the conflict zone or between a transport unit and the obstacle in the movement path.

12 Claims, 8 Drawing Sheets

(56) References Cited

U.S. PATENT DOCUMENTS

| | | |
|---|---|---|
| 2021/0273592 A1 | 9/2021 | Luthe et al. |
| 2021/0273593 A1 | 9/2021 | Luthe et al. |
| 2021/0278863 A1 | 9/2021 | Luthe et al. |
| 2021/0281203 A1 | 9/2021 | Luthe et al. |

FOREIGN PATENT DOCUMENTS

| | | |
|---|---|---|
| DE | 10 2018 129 738 | 5/2020 |
| DE | 10 2018 129 739 | 5/2020 |
| EP | 0 433 522 | 6/1991 |
| EP | 3 095 739 | 11/2016 |
| WO | 2013/059934 | 5/2013 |
| WO | 2015/017933 | 2/2015 |
| WO | 2020/109276 | 6/2020 |
| WO | 2020/109287 | 6/2020 |

OTHER PUBLICATIONS

Austria Search Report conduced in counterparet Austria Appln. No. A50984/2021 (Dec. 12, 2022).

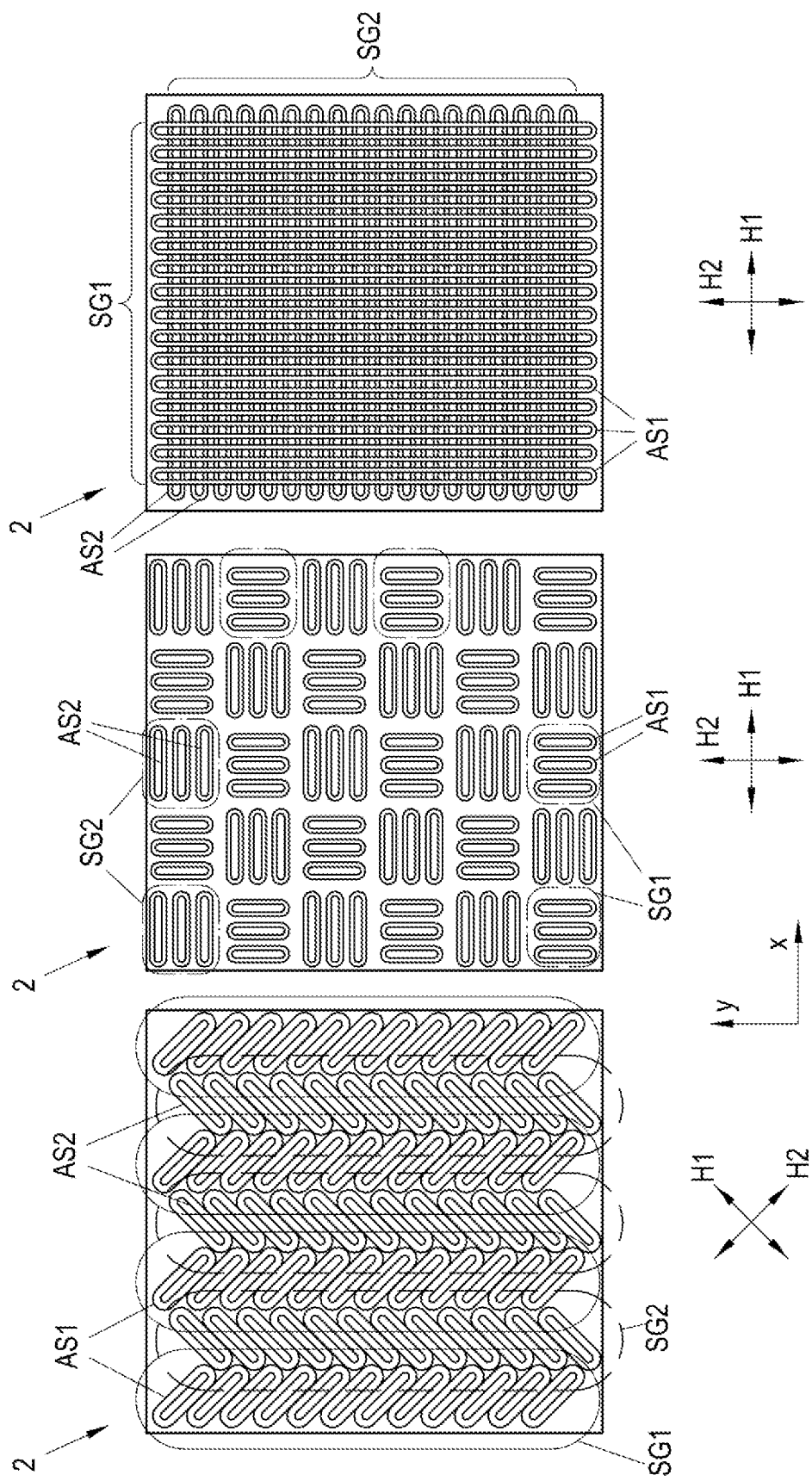

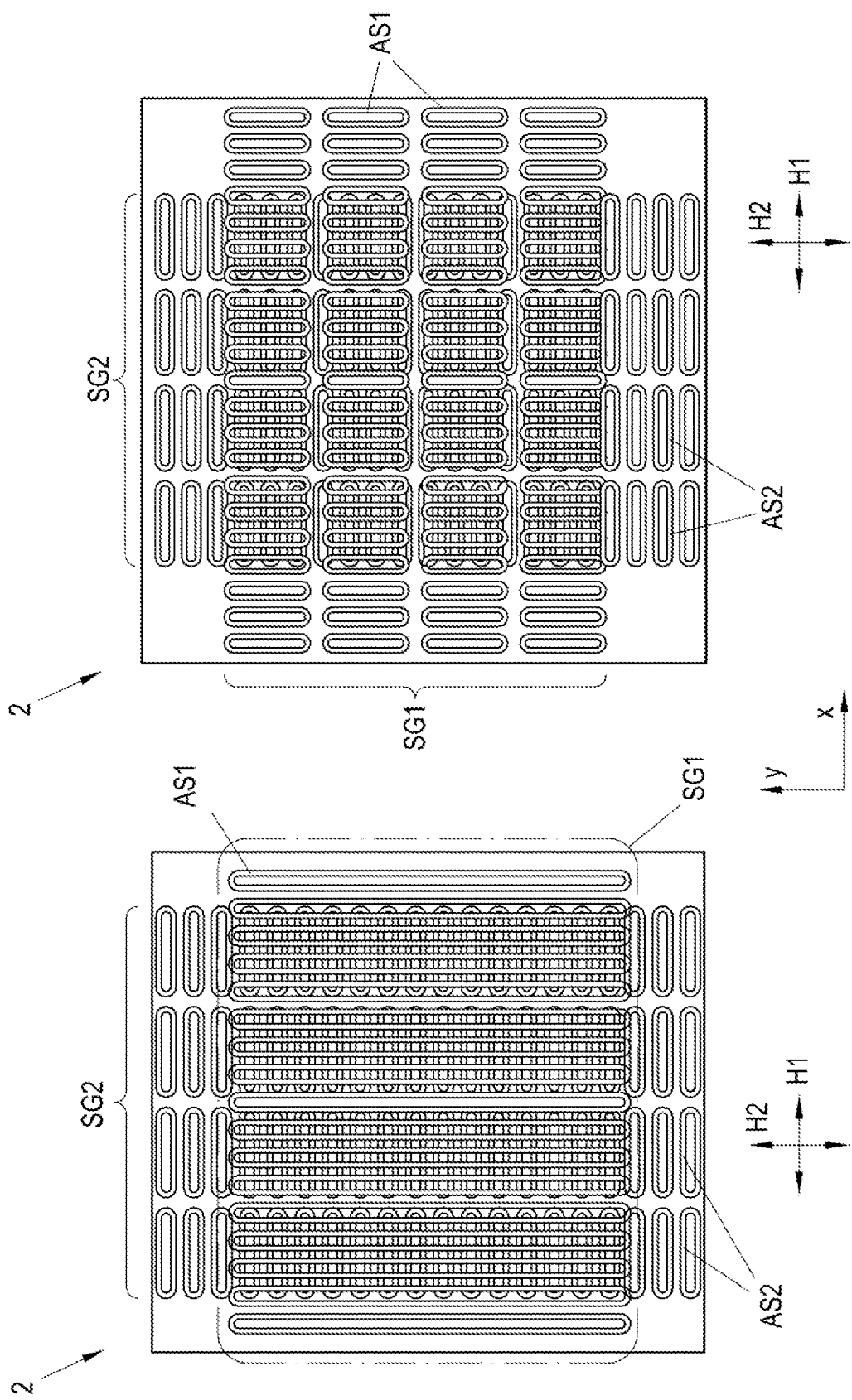

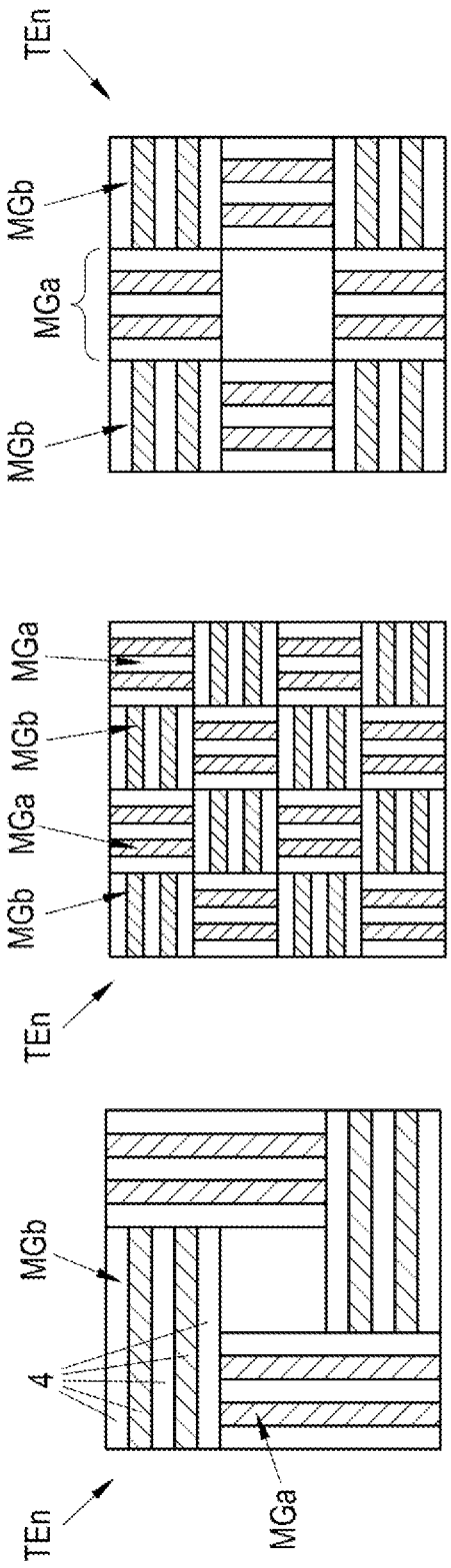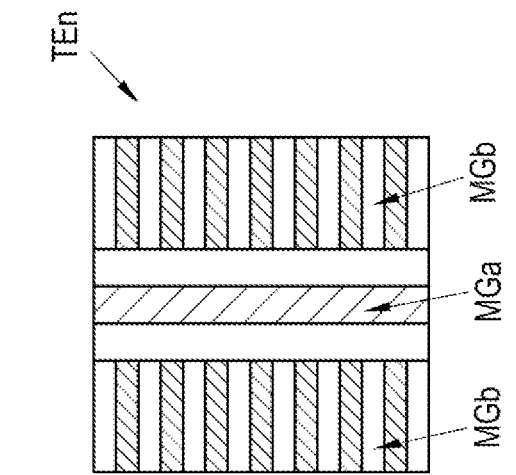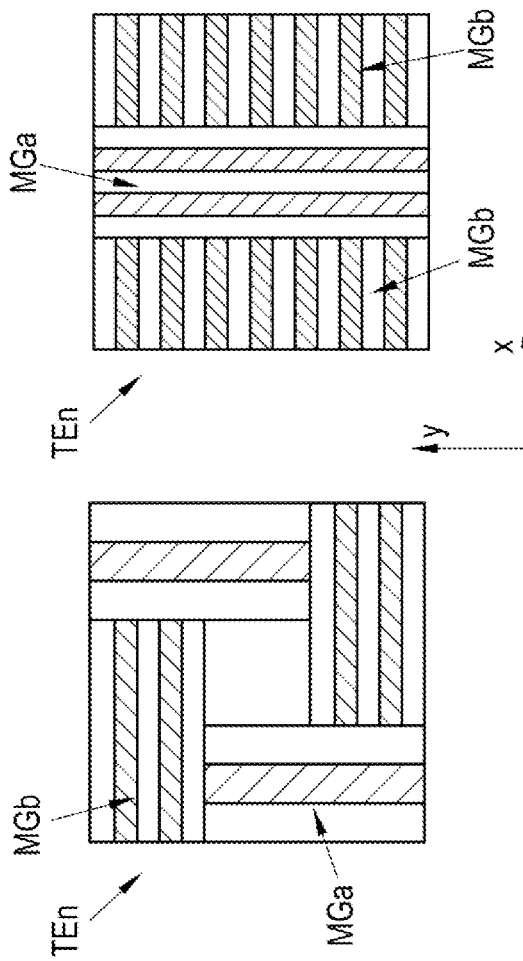

METHOD FOR OPERATING A PLANAR MOTOR

CROSS-REFERENCE TO RELATED APPLICATION

This application claims priority under 35 U.S.C. § 119(a) to Austria Application No. A50984/2021 filed Dec. 9, 2021, the disclosure of which is expressly incorporated by reference herein in its entirety.

BACKGROUND

1. Field of the Invention

The present invention relates to a method for operating a planar motor having a movement plane in which a plurality of movement paths are prespecified along which a plurality of transport units move.

2. Discussion of Background Information

In a planar motor, a primary part (stator) is provided, and at least one secondary part (mover) is provided that is arranged so as to be movable relative to the primary part. Drive coils are arranged on the primary part, and drive magnets are arranged on the secondary part, or vice versa. The drive magnets are designed as permanent magnets, electrical coils, or short-circuit windings. The drive coils are electrical coils that are energized to generate an electromagnetic field. Due to the interaction of the (electro)magnetic fields of the drive magnets and the drive coils, forces act on the secondary part, which forces make it possible to move the secondary part relative to the primary part. The drive coils are arranged on the primary part in a movement plane. Embodiments are also known in which the drive coils are arranged in several planes on the primary part. The secondary part can be moved freely in the movement plane in the two directions of movement. It is also possible to move the secondary part perpendicularly to the movement plane within certain limits. Likewise, rotational movements of the secondary part, and in particular about an axis of rotation perpendicular to the movement plane, can be generated. The secondary part is usually held by forces in suspension above the movement plane.

Planar motors are used, for example, in electromagnetic transport systems in which a transport unit is moved in order to carry out a transport task. The transport unit is designed as a secondary part.

By energizing drive coils in the region of the drive magnets of the transport unit, e.g., by applying electrical voltages to the active drive coils, an electromagnetic field can be generated that interacts with the magnetic field of the drive magnets in order to generate a propulsive force (in the direction of movement in a movement plane along the stator) and/or normal force (in the direction normal to the movement plane) acting on the transport unit. The resulting forces can be influenced by actuating the individual drive coils involved in order to control the generated magnetic flux. As a result, the transport unit can be moved in the desired manner in the movement plane by generating a magnetic field moved in the desired direction by actuating the drive coils. It is also possible to arrange a plurality of transport units on the movement plane, the movements of which can be controlled individually and independently of one another by energizing the drive coils interacting with a transport unit in the required manner—generally by applying an electrical voltage.

Such planar motors, their design, and their mode of operation are well known and are described, for example, in WO 2013/059934 A1 or WO 2015/017933 A1.

As a plurality of transport units can be moved freely in the movement plane, it is necessary to plan the transport path of a transport unit in the movement plane. In the movement plane, there can be a plurality of transport paths along which the transport units can move. Transport paths of different transport units can intersect, such that there may be a risk of a collision between transport units moving on the crossing transport paths. Transport paths can also come close to each other without crossing, such that there is also a risk of collision between transport units moving on the transport paths. It is therefore advantageous to plan the transport paths such that there are no intersections or approaches, or as few intersections or approaches as possible. However, mechanisms are also required that make it possible, on the one hand, to detect a risk of collision and, on the other, to avoid potential collisions. However, such mechanisms require computing capacities and, on the other hand, the throughput of transport units along the transport paths, and thus also a transport capacity of a transport system having a planar motor, can be restricted, because the transport units must maintain certain distances.

WO 2020/109276 A1 describes a planar motor having a predefined path network consisting of a number of paths along which the transport units can move. A path is defined as a one-dimensional line in the movement plane. It is also possible for two paths to intersect. In order to avoid a collision at a crossing point, rules or priorities are defined that establish how two transport units must move over a crossing point in order to avoid a collision—for example, by priority rules, prioritization of transport units, and first-come-first-serve approaches. If there is no risk of collision, there is also no requirement for collision avoidance. If a transport unit approaches a crossing point, for example, without a different transport unit being nearby, this transport unit can pass through the crossing point without querying the rules or priorities.

WO 2020/109287 A1 describes a method for path planning on a planar motor by graphs, consisting of nodes and edges. However, the avoidance of intersections or approaches of transport paths is not discussed.

SUMMARY

Embodiments are directed to a method for operating a planar motor with which the risk of collisions of transport units or of a transport unit with an obstacle in the movement plane can be reduced.

According to embodiments, at least two movement paths in the movement plane are expanded two-dimensionally around the respective movement path, at least in sections, to form a movement route in the movement plane by prespecifying at least in sections of the movement route a width at each point of the movement path and by checking whether the at least two resulting movement routes overlap or one of the resulting movement routes overlaps with itself, or whether one of the resulting movement routes overlaps with an obstacle in the movement plane, which obstacle is defined with, respect to its location and geometry, in order to determine a conflict zone in an overlap region in which there is a risk of collision between transport units moving in the region of the conflict zone on movement routes involved in the conflict zone or a risk of collision between a transport unit moving on a movement route involved in the conflict zone and the obstacle in the movement plane, and the determined conflict zone is taken into account when controlling the movement of the transport units along the assigned movement path in order to avoid collisions between transport units moving on movement routes involved in the conflict zone or between a transport unit and the obstacle in the movement path.

The use of movement routes allows to determine overlapping regions in which there is in principle a risk of collisions in a simple manner. The knowledge of a conflict zone can now be used when controlling the movement of the transport units along the movement paths in order to avoid collisions. This can be used both for collision detection and for collision avoidance. However, the conflict zones also allow access control of transport units to a conflict zone, also in the light of collision avoidance.

The width of the movement route in the movement plane is simply prespecified orthogonally to the respective movement path, which allows simple realization of the concept of the movement route. The width of the movement route in the movement plane can be prespecified, at least in portions, asymmetrically with respect to the movement path, whereby certain movement states of a transport unit on the movement path can also be taken into consideration.

In an advantageous embodiment of the determination of the width, a reference point is determined on a transport unit, and the movement path is related to the reference point. Vectors from the reference point to the outer contour of the transport unit in the movement path are determined at a position of the movement path on both sides of the transport unit as viewed in the direction of movement of the transport unit, and the determined vectors are in each case projected onto a normal on the movement path at this position, and the longest projection on each side are added to the width of the movement route at this position. Based upon the knowledge of the position of the transport unit, this allows in particular fully-automated determination of the width at any desired location of the movement path.

In a particularly advantageous embodiment, the determined conflict zone is taken into account when controlling the movement of the transport units along the assigned movement path in that, for collision avoidance, at least one of the movement routes involved in the conflict zone is replanned, at least in sections, in order to eliminate the conflict zone and/or to reduce the size of the determined conflict zone and/or to reduce a number of determined conflict zones and/or to reduce the number of movement routes involved in the conflict zone and/or to increase a distance between two conflict zones. The movement of transport units that are moving on the replanned transport path then takes place along the at least one replanned transport path. Such replanning can take place after the conflict zone is determined, but before the normal operation of the planar motor, such that the risk of collision can thereby be reduced during operation.

A movement route can be easily replanned in that a geometry of the movement path assigned to the movement route is replanned, at least in sections, in the movement plane, and/or a width of the movement route is changed, at least in sections.

In a further embodiment, the determined conflict zone is taken into account when controlling the movement of the transport units along the assigned movement path by using two-dimensional collision monitoring for collision avoidance in a conflict zone, which two-dimensional collision monitoring checks two-dimensionally whether there is a risk in the conflict zone that a transport unit moving in a movement route involved in the conflict zone will collide with a transport unit moving in another movement route involved in the conflict zone or with an obstacle in the movement plane. Complex, two-dimensional collision monitoring can thus be limited to the conflict zones that have already been restricted beforehand. Collision monitoring can thus be substantially simplified.

In this connection, it is also advantageous if one-dimensional collision monitoring is used on a movement path outside a conflict zone, which one-dimensional collision monitoring checks in the movement direction whether there is a risk of a collision between two transport units traveling behind one another on the movement path. One-dimensional collision monitoring can thus be realized outside of a conflict zone, which one-dimensional collision monitoring can be implemented in a particularly simple manner and with little computation effort.

In a further advantageous embodiment, before a transport unit moving on a movement route involved in a conflict zone enters the conflict zone, it is checked whether said transport unit can exit the conflict zone with the intended movement again without colliding with another transport unit moving on a different movement route involved in the conflict zone, and, in the negative case, entry is denied. The conflict zone can thus also be used by the control of the planar motor for an access logic that controls the access of transport units to the conflict zone.

Embodiments are directed to a method for operating a planar motor having a movement plane in which a plurality of movement paths are prespecified along which a plurality of transport units move. The method includes at least two movement paths in the movement plane are expanded two-dimensionally around the respective movement path, at least in sections, to form a movement route in the movement plane by prespecifying at least in sections of the movement route sections a width at each point of the movement path; checking whether the at least two resulting movement routes overlap, or one of the resulting movement routes overlaps with itself, or whether one of the resulting movement routes overlaps with an obstacle in the movement plane, which obstacle is defined with respect to its location and geometry, in order to determine a conflict zone in an overlap region in which there is a risk of collision between transport units moving in the region of the conflict zone on movement routes involved in the conflict zone or a risk of collision between a transport unit moving on a movement route involved in the conflict zone and the obstacle in the movement plane; and taking the determined conflict zone into account, controlling the movement of the transport units along the assigned movement path in order to avoid collisions between transport units moving on movement routes involved in the conflict zone or between a transport unit and the obstacle in the movement path.

According to embodiments, the width of at least one movement route in the movement plane can be prespecified orthogonally to the assigned movement path.

In accordance with embodiments, the width of at least one movement route in the movement plane may be prespecified asymmetrically to the movement path, at least in sections.

In embodiments, a reference point can be determined on a transport unit, and the movement path is related to the reference point. Further, vectors from the reference point to the outer contour of the transport unit in the movement plane may be determined at a position of the movement path on both sides of the transport unit as viewed in the direction of movement of the transport unit, the determined vectors are in each case projected onto a normal on the movement path at this position, and the longest projection on each side are added to the width of the movement route at this position. Moreover, a prespecified geometric figure, which surrounds the transport unit in the movement plane, can be used as the outer contour.

According to other embodiments, the controlling of the movement of the transport units along the assigned movement path, taking into account the determined conflict zone, can include, for collision avoidance, replanning at least one of the movement routes involved in the conflict zone, at least in sections, in order to eliminate the conflict zone and/or to reduce the size of the determined conflict zone and/or to reduce a number of determined conflict zones and/or to reduce the number of movement routes involved in the conflict zone and/or to increase a distance between two conflict zones. Further, a movement route can be replanned in that the movement path assigned to the movement route is replanned, at least in sections, and/or a width of a movement route is changed, at least in sections.

In other embodiments, the controlling of the movement of the transport units along the assigned movement path, taking into account the determined conflict zone, can include two-dimensional collision monitoring for collision avoidance in a conflict zone, in which the two-dimensional collision monitoring can check whether there is a risk in the conflict zone in the movement plane that a transport unit moving in a movement route involved in the conflict zone will collide with a transport unit moving in another movement route involved in the conflict zone or with an obstacle in the movement plane.

In still other embodiments, the controlling of the movement of the transport units along the assigned movement path, taking into account the determined conflict zone, may include, on a movement path outside of a conflict zone, one-dimensional collision monitoring, in which the one-dimensional collision monitoring checks in the movement direction whether there is a risk of a collision between two transport units traveling behind one another on the movement path.

According to still other embodiments, the controlling of the movement of the transport units along the assigned movement path, taking into account the determined conflict zone, may include checking, before a transport unit moving on a movement route involved in a conflict zone enters the conflict zone, whether said transport unit can exit the conflict zone with the intended movement again without colliding with another transport unit moving on a different movement route involved in the conflict zone, and, in the negative case, entry is denied.

In accordance with still yet other embodiments, the controlling of the movement of the transport units along the assigned movement path, taking into account the determined conflict zone, can include assigning a priority to transport units, and a transport unit having the highest priority is granted entry into a conflict zone first.

Other exemplary embodiments and advantages of the present invention may be ascertained by reviewing the present disclosure and the accompanying drawing.

BRIEF DESCRIPTION OF THE DRAWINGS

The present invention is described below in greater detail with reference to FIGS. 1A through 7, which show schematic and non-limiting advantageous embodiments of the invention by way of example. In the drawings:

FIGS. 2A through 2F show possible arrangements of drive coils on the stator of a planar motor, FIGS. 3A through 3F show possible arrangements of drive magnets on a transport unit of a planar motor.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1A:
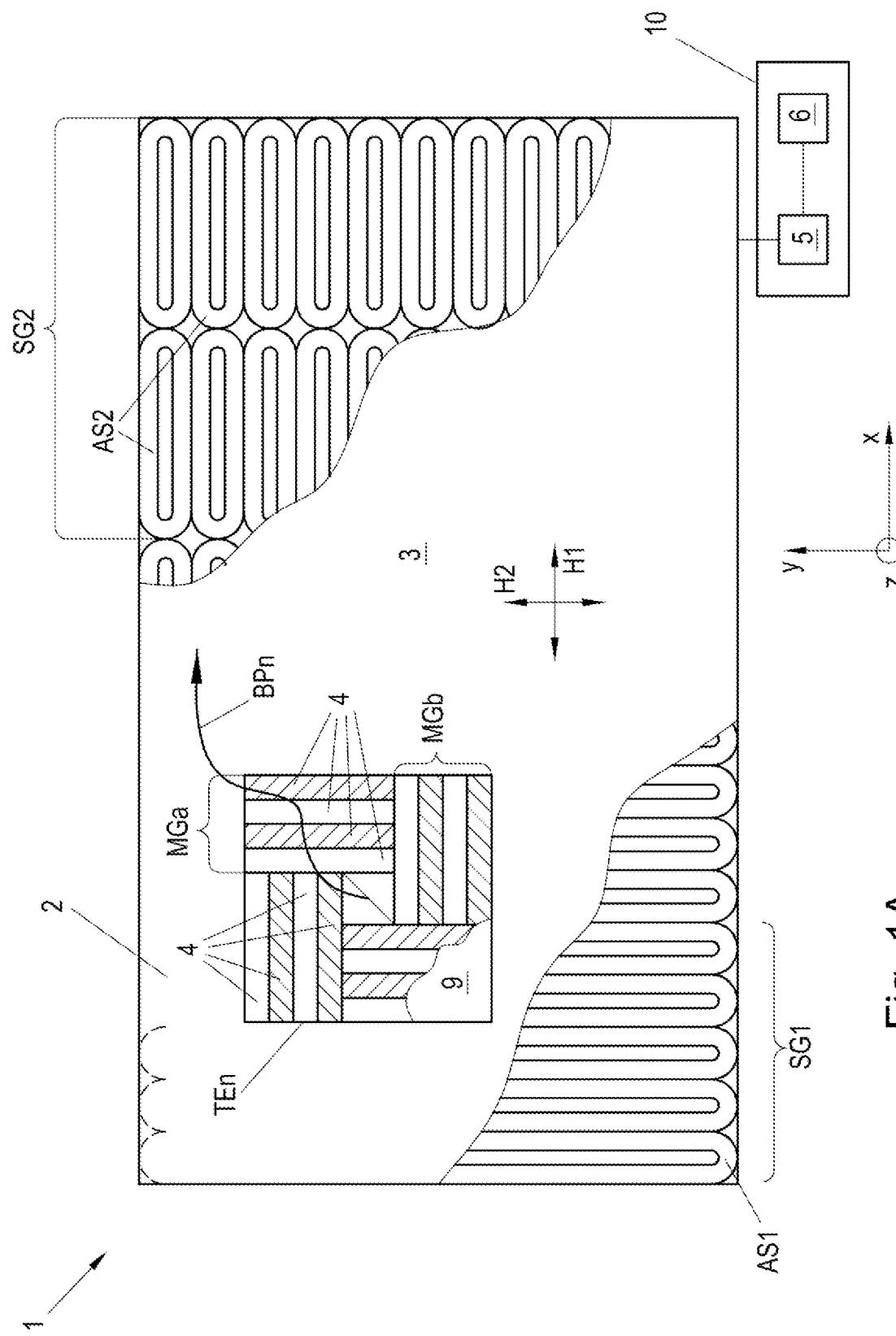
FIG. 1A and FIG. 1B are different views of a possible embodiment of a planar motor.
Figure 1B:
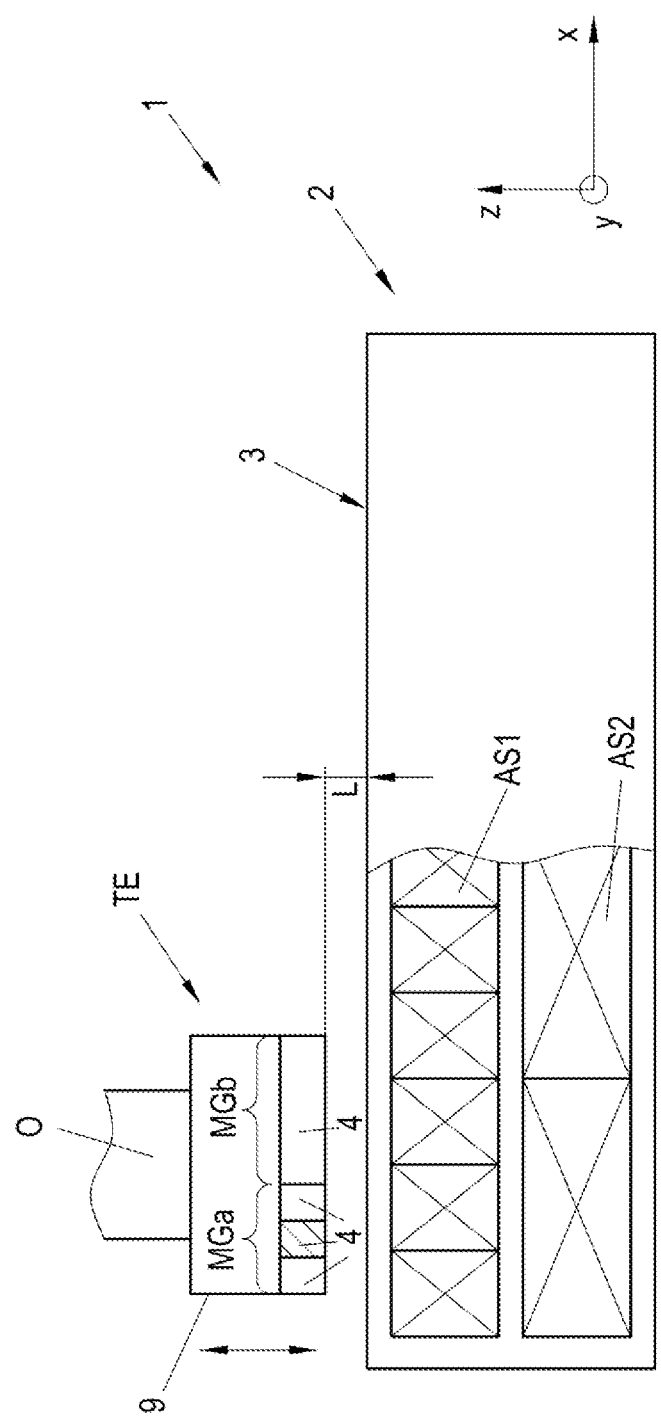
Figure 4A:
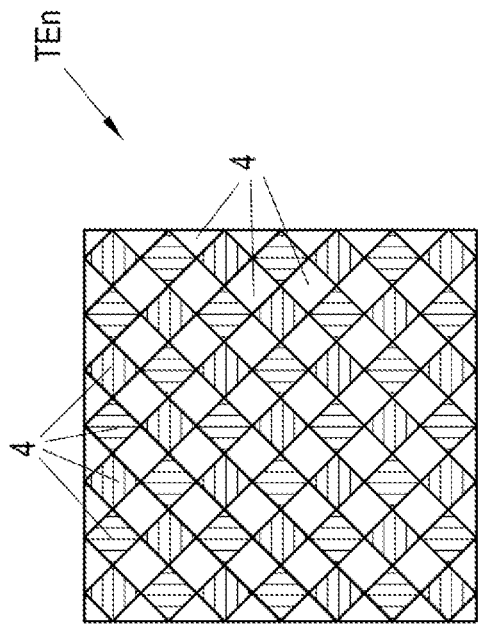
FIGS. 4A through 4D show possible arrangements of drive magnets on a transport unit of a planar motor.
Figure 4B:
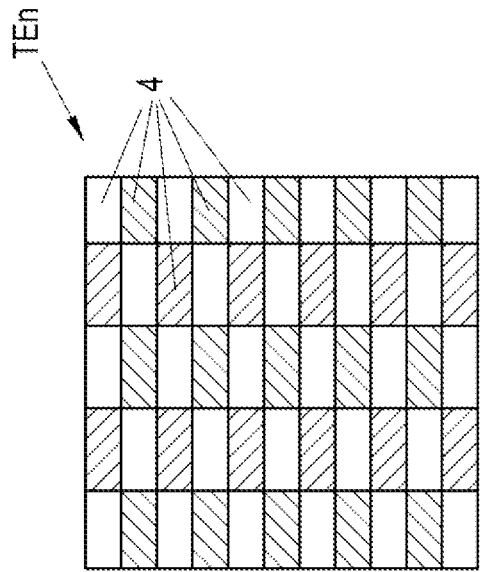
Figure 4C:
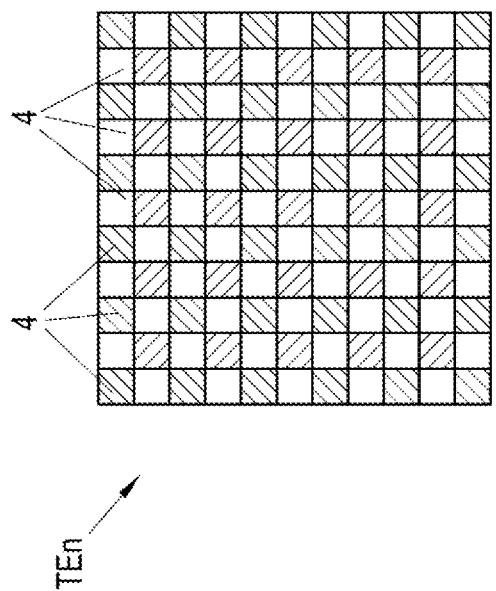
Figure 4D:
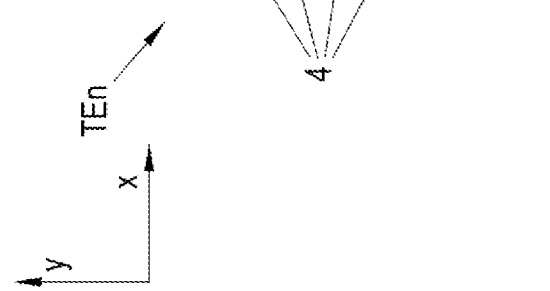

FIGS. 1A and 1B show a simplified exemplary embodiment of a transport device in the form of a planar motor 1. FIG. 1A shows the planar motor 1 in a partially broken-away plan view, and FIG. 1B shows the planar motor 1 in a partially broken-away side view. The planar motor 1 has at least one transport segment 2 as a stator, which forms a movement plane 3, and at least one transport unit TEn, which is movable in the movement plane 3 at least two-dimensionally in two main movement directions H1, H2. "n" is used as an index in order to be able to distinguish different transport units, wherein, generally, the reference sign TEn is used when no specific transport unit is addressed. Within the scope of the invention, the movement plane 3 refers to the planar surface of the transport segment 2, which movement plane is determined by the size and shape of the transport segment 2. The movement plane 3 can be oriented in space in any way. For the sake of simplicity, only one transport segment 2 is shown in FIG. 1A. Of course, a plurality of transport segments 2 (which can be different) could be arranged next to each other in order to form the stator and a larger movement plane 3. As a result, the transport device 1 can have a modular design, and movement planes 3 of different shapes and sizes can be realized. Of course, this modular design is only optional, and it is also possible to provide only a single transport segment 2 in the form of a single assembly. In the movement plane 3 of the transport segment 2, several transport units TEn, including different transport units, can naturally also be moved simultaneously and independently of one another.

A first coil group SG1 with several drive coils AS1, which defines the first main movement direction H1, and a second coil group SG2 with several drive coils AS2, which defines the second main movement direction H2, are arranged on the transport segment 2. In general, the drive coils are also designated by ASi, where "i" is an index, in order to be able to distinguish the drive coils if necessary. The drive coils AS1 of the first coil group SG1 are arranged next to each other in a specific direction—in this case, in the X-direction of a Cartesian coordinate system—in order to form the first main movement direction H1 for the movement of the transport unit TEn, which in this case extends along the X-axis. The drive coils AS2 of the second coil group SG2 are arranged next to each other in a specific direction—in this case, the Y-direction of a Cartesian coordinate system—in order to form a second main movement direction H2 for the transport unit TEn, which in this case extends along the Y-axis. The drive coils AS1, AS2 of the first and second coil groups SG1, SG2, as shown in FIG. 1A, are preferably arranged relative to one another such that the two main movement directions H1, H2 are orthogonal to one another.

Several drive magnets 4 are arranged on the at least one transport unit TEn, which interact electromagnetically with drive coils AS1, AS2 of at least one of the two coil groups SG1, SG2 in the region of the transport unit TEn for moving the transport unit TEn. For this purpose, the transport unit TEn generally has a main body 9, on the underside of which (facing the movement plane 3) the drive magnets 4 are arranged, as can be seen in FIG. 1B. In FIG. 1A, the main body 9 is shown largely broken away to be able to see the arrangement of the drive magnets 4. As indicated in FIG. 1B, the drive magnets 4 are arranged in several magnet groups MGa, MGb. The drive magnets 4 are usually arranged with alternating polarity, as indicated in FIG. 1B. The drive magnets 4 can also be oriented differently in the different magnet groups MGa, MGb.

In the example shown, two first magnet groups MGa and two second magnet groups MGb are arranged on the transport unit TEn. A single first magnet group MGa and a single second magnet group MGb per transport unit TEn are substantially sufficient to move the transport unit TEn in the movement plane 3. Of course, more than two first magnet groups MGa and more than two second magnet groups MGb can also be arranged per transport unit TE. An unequal number of first and second magnet groups MGa, MGb would also be conceivable—for example, two first magnet groups MGa and one second magnet group MGb. In the magnet groups MGa, MGb, several drive magnets 4 of different magnetization directions are provided, which are arranged next to each other in a specific arrangement direction. In this case, the arrangement direction of the first magnet groups MGa corresponds to the X-direction, and the arrangement direction of the second magnet groups MGb corresponds to the Y-direction. Analogously to the main movement directions H1, H2, the arrangement directions are thus preferably orthogonal to one another. The arrangement directions of the magnet groups MGa, MGb preferably run as parallel as possible to the main movement directions H1, H2 in order to allow for the most efficient generation of electromagnetic force possible. The example shown is a known 1-D arrangement of the drive magnets 4 on the transport unit TEn, but an also known 2-D arrangement would also be possible, as will be explained in detail with reference to FIGS. 4A-4D.

With the planar motor 1 shown, a substantially unrestricted movement of a transport unit TEn in the two main movement directions H1, H2 would be possible, for example, in the movement plane 3 of the transport segment 2. It could in this case be possible to move the transport unit TEn, for example, only along the X-axis or only along the Y-axis. The transport unit TEn can naturally be moved simultaneously in both main movement directions H1, H2, e.g., along a two-dimensional movement path BPn lying in the movement plane 3 with an X-coordinate and a Y-coordinate, as indicated on the transport unit TEn in FIG. 1A.

With a corresponding structural design of the transport segment 2 and the respective transport unit TEn, the other four degrees of freedom can also be used at least to a limited extent (translational movement in the vertical direction Z+rotation about the three axes X, Y, Z).

Drive coils ASi can also be arranged one above the other in the normal direction (here, in the Z-direction). In the embodiment according to FIG. 1B, the drive coils AS1 of the first coil group SG1 are arranged closer to the movement plane 3 in the direction perpendicular to the movement plane 3 (here, in the Z-direction) than the drive coils AS2 of the second coil group SG2.

FIGS. 2A-2E show schematically, by way of example and in a non-limiting manner, different possibilities of an arrangement of drive coils ASi on a transport segment. FIGS. 2A and 2B show so-called single-layer variants in which the first and second coil groups SG1, SG2 are arranged in the same plane. FIGS. 2C-2E show so-called double-layer or multilayer designs in which the first and second coil groups SG1, SG2 are arranged in layers one above the other in the vertical direction, as explained above with reference to FIG. 1B.

FIG. 2A shows a so-called "herringbone" arrangement of the drive coils AS1, AS2 of the two coil groups SG1, SG2. In contrast to the other designs of FIGS. 2B-2E, the two main movement directions H1, H2 do not in this case run parallel to the edges of the transport segment 2 (in this case, in the X- and Y-direction), but obliquely to them. FIG. 2C shows a "double-layer" embodiment in which "long" drive coils AS1, AS2 are provided both in the first coil group SG1 and in the second coil group SG2. FIG. 2D shows an embodiment with "long" drive coils AS1 in the first coil group SG1 and "short" drive coils AS2 in the second coil group SG2. FIG. 2E shows an example with "short" drive coils AS1 in the first coil group SG1 and "short" drive coils AS2 in the second coil group SG2, wherein the coil groups are arranged one above the other.

FIGS. 3A-3F and FIGS. 4A-4D, schematically and by way of example, show different arrangements of drive magnets 4 on a transport unit TEn. A basic distinction is made between a so-called 1-D arrangement (FIGS. 3A-3F) and a 2-D arrangement (FIGS. 4A-4D). In the 1-D arrangement, at least one first magnet group MGa with several drive magnets 4 for the first main movement direction H1 (in this case, X-axis) and at least one second magnet group MGb with several drive magnets 4 for the second main movement direction H2 (in this case, Y-axis) are provided. The magnet groups MGa, MGb each have a specific number of drive magnets 4, in particular permanent magnets, arranged one behind the other in a specific arrangement direction (in this case, MGa in the X-direction and MGb in the Y-direction). Adjacent drive magnets 4 have a different magnetization direction. For example, the magnetization direction of adjacent drive magnets 4 can be rotated by 180° to one another, i.e., alternating magnetic north and south poles, as indicated by the shaded and not shaded drive magnets 4. The drive magnets 4 of a magnet group MGi can also be arranged in the known Halbach arrangement, wherein a drive magnet 4 with a magnetization direction rotated by 90° is provided, for example, between drive magnets 4 with opposite magnetization directions (north pole, south pole). The Halbach arrangement has the advantage that the magnetic flux on one side of the magnet group MGj (preferably on the side facing the movement plane 3) is greater than on the opposite side. The Halbach arrangement is known in the prior art, and therefore no further details are provided at this point.

In the 2-D arrangement, individual drive magnets 4 with different magnetization directions are arranged on the transport unit TE essentially in the manner of a chessboard. The drive magnets 4 with different magnetization directions are arranged alternately and offset in two arrangement directions (in this case, X- and Y-direction). The two directions are preferably oriented to one another in the same way as the two main movement directions H1, H2, i.e., they are, for example, perpendicular to one another. It is immediately apparent that there are a large number of different options for the arrangement, wherein the most common variants of the 1-D arrangement are shown in FIGS. 3A-3F, and the most common variants of the 2-D arrangement are shown in FIGS. 4A-4D. In the 2-D arrangement, the first magnet group MGa corresponds to the drive magnets 4 arranged alternately in one direction (e.g., in the X-direction) and the second magnet group MGb corresponds to the drive magnets 4 arranged alternately in the respective other direction (e.g., in the Y-direction). The magnet groups MGa, MGb are therefore not separate in the 2-D arrangement, as in the 1-D arrangement, but, rather, the drive magnets 4 are part of the first magnet groups MGa and part of the second magnet groups MGb.

A control unit 10 is also provided in the planar motor 1, with which the drive coils ASi of the transport segment 2 can be controlled for energizing, as indicated in FIG. 1A. Essentially, this means that the drive coils ASi are energized by the control unit 10 such that the transport unit TEn executes a desired movement path BPn in the movement plane 3, wherein the movement path BPn is not limited only to a movement in the main movement directions H1, H2, but can also specify movements in the four other degrees of freedom. The movement path BPn is usually prespecified, e.g., for implementing a transport task with the planar motor 1 as a transport device or in dependence of a specific production process of a system in which the planar motor 1 is integrated as a transport device.

The planar motor 1, and more specifically the drive coils ASi of the planar motor 1, is controlled by the control unit 10 such that a transport unit TEn moves along the desired movement path BPn in the movement plane 3. A specific movement profile having movement variables (including in different spatial directions) of the transport unit TEn, such as speed, acceleration, etc., can be prespecified for the movement.

An actual value of the movement of the transport unit TEn, e.g., an actual position (also an actual orientation of the transport unit TEn) or an actual speed, is usually also used for the implementation of the movement path BPn in the control unit 10. For this purpose, suitable sensors, e.g., position sensors, can also be arranged on the transport segment 2, the detected measured variables of which are transmitted as actual values to the control unit 10 or from which actual values are determined in the control unit 10.

The control unit (controller) 10 can also be designed as a distributed controller, e.g., having a number of coil control units 5, and preferably one coil control unit (controller) 5 per drive coil ASi, and a superordinate system control unit (controller) 6 that is connected to the number of the coil control unit 5—for example, via a communications network. A segment control unit can also be provided, which is connected on the one hand to the system control unit 6 and, on the other, to the number of the coil control units 5—for example, via a communications network in each case. The coil control units 5, the system control unit 6, and optionally the segment control unit then share the control of a transport unit TEn among one another in a prespecified manner. For example, the system control unit 6 can implement the transport task and prespecify target points for the transport unit TEn in the movement plane 3 to the segment control unit. The system control unit 6 can also serve to detect and/or avoid potential collisions between transport units TEn. The segment control unit can then determine a movement path BPn for the transport unit TEn for moving to the target point and determine setpoints for implementing the movement path BPn, e.g., setpoint coil voltages or setpoint coil currents, for the drive coils ASi participating in the movement. The setpoints are then transferred to the coil control units 5 of drive coils ASi participating in the movement, which are then effectuated by the coil control units 5. For this purpose, power electronics can also be provided on a transport segment 2, which power electronics generate the required coil voltages or coil currents and apply them to the drive coils ASi. It is also conceivable for a segment control unit to be provided for each transport segment 2 or for a group of transport segments 2, which segment control unit is then responsible for implementing the movement path BPn on the associated transport segment 2.

A control unit (controller) can be implemented as microprocessor-based hardware, e.g., as a computer, microcontroller, digital signal processor (DSP), programmable logic controller (PLC), etc., on which corresponding control programs for implementing the respective function run. An embodiment as an integrated circuit, such as, for example, an application-specific integrated circuit (ASCI) or field programmable gate array (FPGA), is also conceivable.

A substantially moving magnetic field is generated in the first main movement direction H1 by corresponding activation of the first drive coils AS1. The moving magnetic field in the first main movement direction mainly interacts electromagnetically with the drive magnets 4 of the first magnet group(s) MGa in order to move the respective transport unit TEn in the first main movement direction H1. Analogously, by activating the second drive coils AS2, a substantially moving magnetic field is generated in the second main movement direction H2, which substantially moving magnetic field mainly interacts electromagnetically with the drive magnets 4 of the second magnet group(s) MGb in order to move the transport unit TEn in the second main movement direction H2. Depending upon the activation of the drive coils AS1, AS2, the moving magnetic fields are superimposed, as a result of which the transport unit TEn can be moved in the desired manner along the prespecified two-dimensional movement path BPn in the movement plane 3.

In addition to the two, essentially unlimited translational degrees of freedom in the main movement directions H1, H2 in the movement plane 3, a limited translational movement of a transport unit in the normal direction on the movement plane 3 is also possible—in this case in the direction of the Z-axis. Depending upon the arrangement and the design of the drive coils AS1, AS2 of the coil groups SG1, SG2 and the first and second magnet groups MGa, MGb interacting therewith, an at least limited rotation of the transport units TEn about the three spatial axes X, Y, Z is also possible. A complete rotation can also be realized around the vertical axis Z.

The drive coils ASi are usually activated in such a way that a force acts on the transport unit TEn in the direction of the Z-axis, with which force the transport unit TEn is kept levitating above the movement plane 3 for generating an air gap L (FIG. 1B) (which is also possible while the transport unit TEn is at a standstill).

The air gap L can, if necessary, also be increased and decreased to a limited extent by appropriate control of the drive coils ASi, as a result of which the transport unit TE can be moved in the vertical direction—in this case, in the Z-direction, as indicated by the double arrow on the transport unit TEn in FIG. 1B. The extension of the available freedom of movement in the vertical direction depends substantially upon the structural design of the planar motor 1, and in particular upon the maximum magnetic field that can be generated by the drive coils ASi and the design and arrangement of the drive magnets 4, as well as the mass and load of the transport unit TEn.

The above statements regarding the structure and function of a planar motor 1 are merely for explanatory purposes and are not to be understood as limiting, and serve for better understanding. For the present invention, it is irrelevant how the planar motor 1 is constructed. It is decisive for the invention that a plurality of transport units TEn can be moved along movement paths BPn in the movement plane 3 of the planar motor 1. At least two movement paths BPn are provided, and each transport unit TEn can in principle be moved on each movement path BPn.

A movement path BPn can be an open path, i.e., a path whose beginning and end do not coincide, or a closed path, i.e., a path whose beginning and end coincide.

The movement paths BPn of the transport units TEn moved on the planar motor 1 are usually planned in advance—for example, in order to realize a specific transport task with the planar motor 1. Additionally or alternatively, a movement path BPn, or also a part thereof, can be determined or defined during operation in order to ensure further flexibility. The movement paths BPn of the transport units TEn in the movement plane 3 can, for carrying out the invention, in any case be assumed to be known.

Because a movement path BP can be defined freely in the movement plane 3, it can happen that two movement paths BPn intersect or that two movement paths BPn come close to one another, such that there is a risk of collision between two transport units TEn moving on the movement paths BPn. It is also conceivable that a movement path BPn intersect itself or come to close to itself, or that a movement path BPn be located in the region of an obstacle defined with respect to its location and size in the movement plane. In these cases, too, there is a risk of a collision of a transport unit TEn with another transport unit TEn or with an obstacle. Any undesired contact caused by the movement between two transport units TEn (which also comprises an object O transported therewith) or between a transport unit TEn and an obstacle is considered a collision. Because the transport units TEn can move freely in the movement plane 3, a collision can occur practically in any direction. During operation of the planar motor 1, e.g., as a transport device for transporting objects O, such collisions are usually undesirable and are to be avoided. In exceptional cases, situations can also occur in which transport units TEn come very close to one another or even touch. This is the case, for example, when several transport units TEn are combined in order to generate higher forces or transport larger/heavier products. It would also be conceivable for two transport units TEn to apply a force to a workpiece by moving relative to one another and thus carry out a work process step. Such "intentional collisions" are of course not undesirable, and are therefore not to be avoided.

Figure 5:
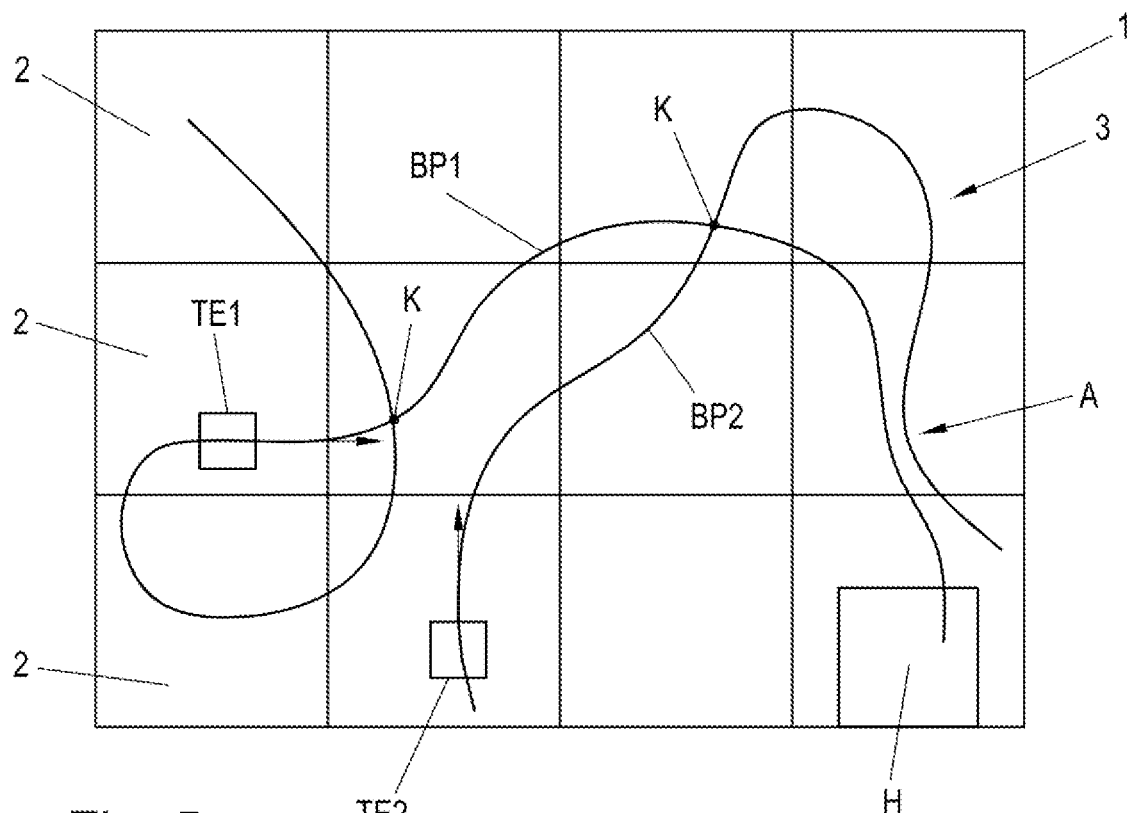
FIG. 5 shows movement paths of transport units in a movement plane of the planar motor.

The fundamental problem with undesired collisions is shown schematically in FIG. 5. The stator of the planar motor 1 consists of at least one, and in this embodiment of several, transport segments 2 that form the movement plane 3 as described above. Drive coils ASi and drive magnets 4 are not shown here, for reasons of clarity. In the movement plane 3, a first transport unit TE1 is to be moved along a first movement path BP1. A second transport unit TE2 is to be moved simultaneously along a second movement path BP2. The first movement path BP1 and the second movement path BP2 intersect, however, such that a risk of an undesired collision between the transport units TE1, TE2 moving on the movement paths BP1, BP2 exists in the region of the intersection point K. A collision can then occur when the two transport units TE1, TE2 move simultaneously in the vicinity of the intersection point K. However, there is also a risk of collision when the two movement paths BP1, BP2 come too close to one another in an approach region A but do not intersect, such that the transport units TE1, TE2 moving thereon could touch when the two transport units TE1, TE2 move simultaneously in the vicinity of the approach region A. Such an approach region A is shown in FIG. 5. There is also a risk of collision when a movement path BPn overlaps in the region of an obstacle H defined with respect to its location and geometry in the movement plane 3, as shown in FIG. 5 using the example of the movement path BP1. For the risk of collision, it is irrelevant in which direction the transport unit TE1, TE2 moves along the respective movement path BP1, BP2.

In order to avoid collisions between transport units TEn or between a transport unit TEn and an obstacle H, it is necessary, on the one hand, to detect a risk of collision and, on the other, to also take corresponding steps for avoiding collisions when a collision is detected. Because collision detection and collision avoidance are computationally very complex, the invention begins earlier, and an attempt is made to plan the movement paths BPn in such a way that collisions cannot occur at all, or the locations in the movement plane 3 at which a collision can occur are at least reduced.

Figure 6:
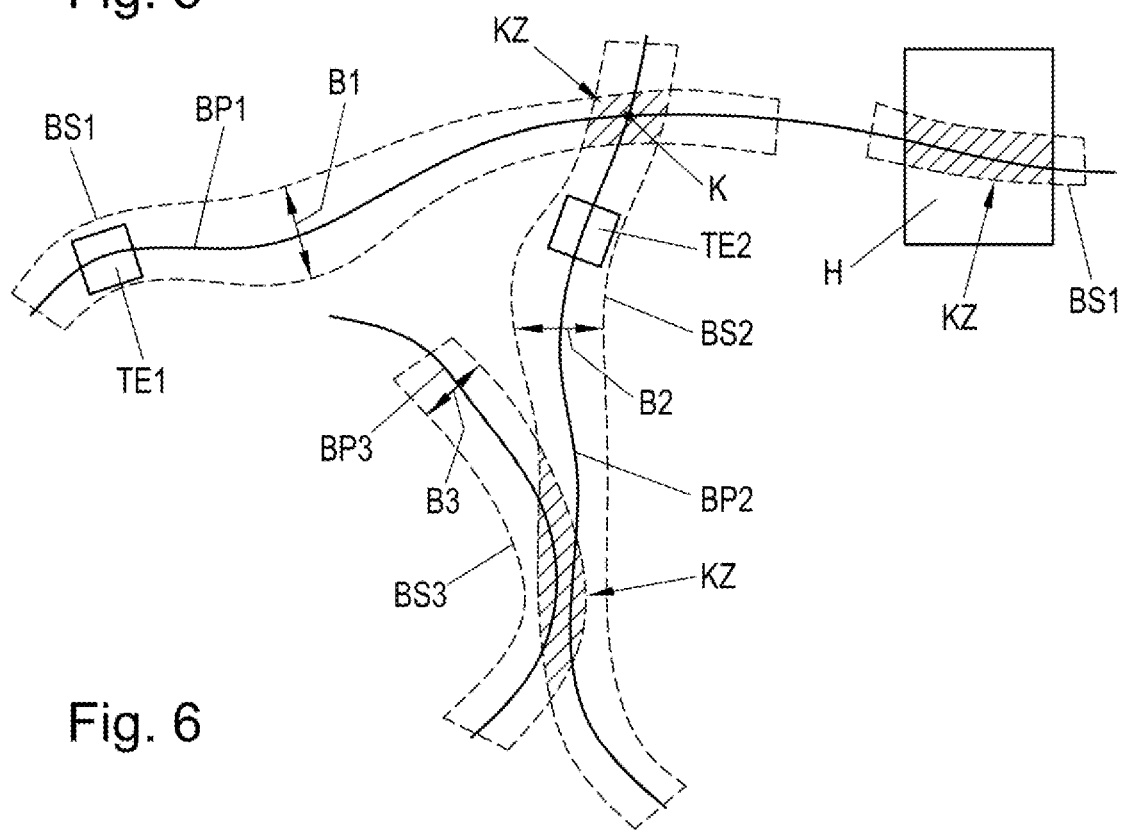
FIG. 6 shows movement routes around movement paths of transport units and conflict zones in a movement plane of the planar motor.

In order to avoid collisions, or at least to reduce the risk of collisions, it is provided that each movement path BPn in the movement plane 3, at least in sections in the direction of movement, be expanded two-dimensionally around the movement path BPn to form a movement route BSn in the movement plane 3. For this purpose, a width B1, B2 of the movement route BSI, BS2 is prespecified at each location of the movement paths BP1, BP2, at least in sections thereof, as shown in FIG. 6. In sections, because the movement route BSn does not necessarily have to be prespecified along the entire length of the movement path BPn. In principle, it is sufficient if the movement route BSn is defined only along certain sections of the movement path BPn. For example, no movement route BSn has to be defined in sections where, due to the structure of the planar motor 1 or due to other conditions, it is known from the outset that there can be no collisions between transport units TEn on different movement paths BPn or with an obstacle H. This can be the case, for example, if only a single movement path BPn is, in general, provided for all transport units TEn at certain sections.

The width Bn is defined, e.g., configured, and thus known at each location of the movement path BPn at which a movement route BSn is present. A transport unit TEn (preferably including an object transported therewith) that is moving on a movement path BPn is preferably completely encompassed by a movement route BSn defined thereon. This means that the transport unit TEn does not protrude from the movement route BSn at any point.

The width Bn can, in addition to the position along the movement path BPn, also be dependent upon other influencing factors, such as, for example, the type or the size of the transport unit TEn, an expansion of an object O transported using a transport unit TEn, a rotation of the transport unit TEn about a vertical axis (e.g., in the Z-direction) or another axis, a maximum expected positioning error (for example, the deviation between a setpoint position and an actual position) of the control of the movement, a maximum speed, a prespecified safety distance, etc. However, the width Bn or the profile of the width Bn along a movement path BPn can also be easily configured—for example, in the control unit 10.

The width Bn in the movement plane 3 is preferably in each case orthogonal to the respective movement path BPn. In the movement plane 3, it is thus perpendicular to the movement path BPn in a straight line and perpendicular to the tangent on the movement path BPn in a curve.

However, the width Bn does not have to be prespecified symmetrically with respect to the movement path BPn, but can also be prespecified asymmetrically about the movement path BPn, i.e., the proportions of the width Bn are different on both sides (as seen in the movement direction) of the movement path BPn.

Figure 7:
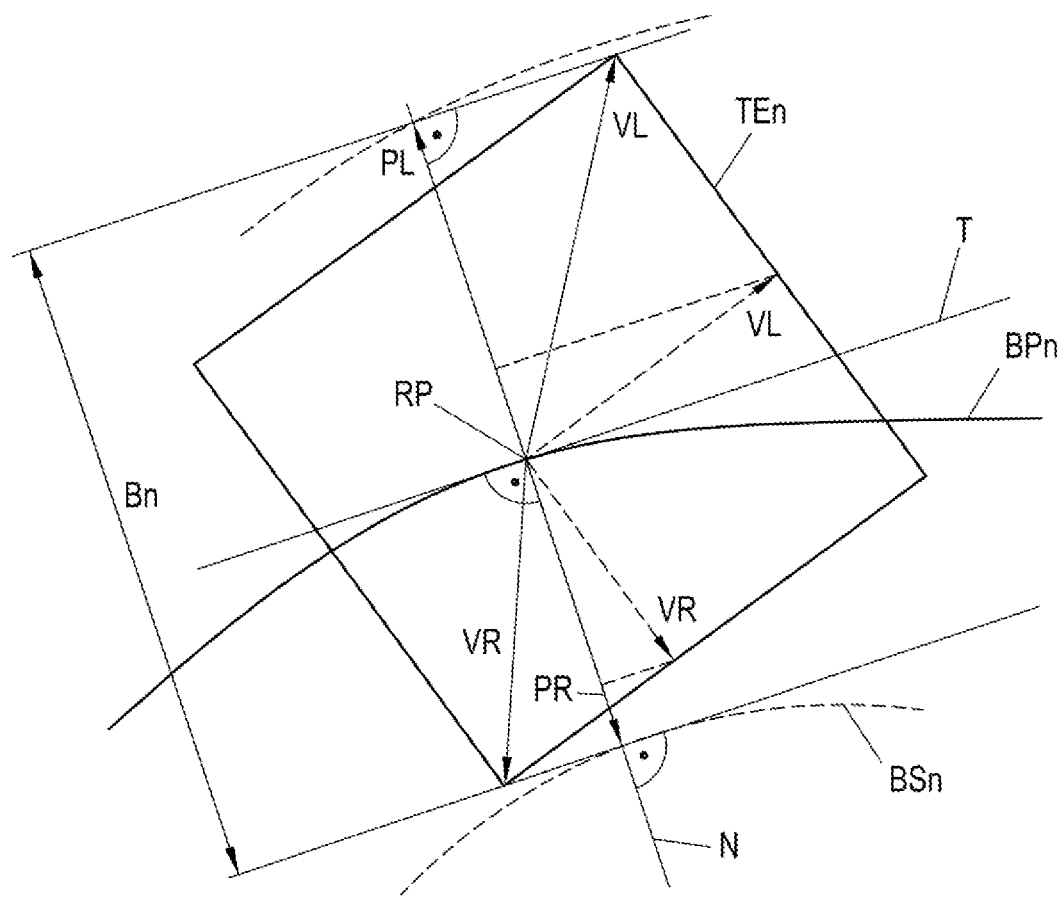
FIG. 7 shows an advantageous determination of a width of a movement route.

In order to determine the width Bn at a specific position along the movement path BPn, it is possible in a possible embodiment to proceed as explained with reference to FIG. 7. It is assumed that the movement path BPn of a transport unit TEn is prespecified in relation to a reference point RP of the transport unit TEn and thus known. The reference point RP can in principle be any point of the transport unit TEn, for example, a geometric center point or the location of the center of gravity of the transport unit TEn in the movement plane 3. Because the geometry of the transport unit TEn is known, vectors VL, VR can be determined from the reference point RP to the outer contour of the transport unit TEn in the movement plane 3 (optionally taking into account a transported object) on each side (relative to the movement path BPn). Said vectors VL, VR are projected onto the normal N on the movement path BPn (or on the tangent T on the movement path BPn). The longest projection PL, PR on each side is then added, and the sum of the longest projections PL, PR is then used as the width Bn at this point of the movement path BPn, i.e., Bn=(PL+PR). This results, for example, in a width Bn that is asymmetrical relative to the movement path BPn when the longest projections PL, PR are different. This procedure makes it possible for a transport unit TEn to determine the widths Bn of the movement route Bn computationally at any desired point of the movement path BPn. In this case, the dimensions of the transport unit TEn, and possibly of an object O transported therewith, as well as a rotation about the vertical axis (or other axes) are automatically taken into account, because the location and orientation of the transport unit TEn are included in this determination. Likewise, a safety distance can simply be taken into account in that the vectors VL, VR or their projections PL, PR are simply extended by a certain value. Such a safety distance can also be dependent upon a movement variable of a transport unit TEn, such as a speed or acceleration. When determining the widths Bn, the outer contour can also be simplified, e.g., by placing a simple two-dimensional or three-dimensional geometric figure (or body), such as a circle, rectangle, or polygon, around the outer contour of the transport unit TEn and then determining the vectors VL, VR and the longest projections PL, PR on the basis of said geometric figure (body). The widths Bn can be determined offline—for example, before the transport task is started. However, the widths Bn can also be newly determined online during operation—for example, when a transport unit TEn is reloaded.

However, the width BR of sent route BSn can also be determined by simulating a movement of a transport unit TEn of a movement path BPn. For this purpose, simulation tools are available with which such simulations can be carried out. The movement of a two-dimensional geometric figure or of a three-dimensional body in the movement plane 3 is substantially simulated by the simulation. In this case, too, a simple geometric figure (body) can be placed around the outer contour of the transport unit TEn in order to simplify the simulation. In this case, the transport unit TEn (or the surrounding figure/body) sweeps over a certain area in the movement plane 3 (in the case of a three-dimensional simulation optionally projected onto the movement plane 3). Said area will extend on both sides of the movement path BPn (as seen in the movement direction), from which the width Bn can be determined at any desired point. The envelope of said area in the movement plane 3 can also be determined. The width Bn can then be determined from the envelope at any point. A safety distance can also be taken into account in these cases.

It is immediately recognizable that, for various transport units TEn, e.g., different types or sizes, different transported objects O, different movement variables of a transport unit TEn, etc., there can also be different movement routes BSn, but this does not change anything about the basic procedure according to the invention. If several movement routes BSn having different widths Bn arise along a section of a movement path BPn, it can also be provided that the movement route BSn having the largest width Bn be generally used in such a section. Thus, if different types of transport units TEn are to be moved along a common movement path BPn, then preferably only one movement route BSn can be generated, by considering a maximum envelope of all types during generation. Alternatively, a separate movement route BSn can be determined or prespecified for each pair consisting of a transport unit TEn and a movement path BPn. Mixed forms are also possible, of course.

All movement routes BSn for all movement paths BPn and all transport units TEn of the planar motor 1, e.g., for implementing a transport task, can be determined in advance. This can take place, for example, after the movement paths BPn have been planned or before the planar motor 1 is put into operation for the first time or again. In addition, reconfiguring a movement path BPn and/or a movement route BSn at runtime is conceivable—for example, by recreating, changing, or deleting a movement route BSn during operation of the planar motor. Such reconfiguration is preferably carried out in the remaining runtime of a prespecified time step of the control unit 10 or on a separate control unit. As soon as the new configuration is created and, preferably, all transport units TEn are also located on a movement route BSn with respect to the new configuration, it is possible to change to said movement route in the control unit 10. Because the creation of the new configuration is completed before switching to the new operating mode, all movement routes BSn are known also in this case. However, an additional movement route BSn can also have only a temporary character, such that it is used, for example, only for a single movement in order, for example, to initially transfer a transport unit TEn to another movement route BSn.

With the known movement routes BSn, a check is now carried out to determine whether movement routes BSn overlap in the movement plane 3, i.e., whether at least a first movement route BS1 and a second movement route BS2 intersect, or a movement route BSn overlaps itself, or a movement route BSn and an obstacle H defined in the movement plane 3 overlap, in order to determine possible conflict zones KZ in the overlap region. Of course, different overlaps are also possible at the same time. An overlap region is thus the region in which at least one of the overlaps described above occurs. This is shown schematically in FIG. 6, wherein conflict zones KZ are shown hatched in overlapping regions between movement routes BSn or in the region of an obstacle H. However, it is conceivable that more than two movement routes BSn overlap in an overlap region.

In general, a conflict zone KZ is understood to mean a geometric region in the movement plane 3 in which at least two transport units TEn moving on different or identical movement paths BPn could collide, or in which a transport unit TEn could collide with an obstacle.

However, a movement route BSn can also be used to check whether the movement route BSn is completely within a prespecified permissible range of movement of the movement plane 3. The permissible range of movement can, on the one hand, be limited in a natural manner by the edges of the movement plane 3. On the other hand, obstacles within the movement plane 3, which must be avoided by all or only individual transport units TEn, can also be defined. Said obstacles H are regarded as logical limits of the range of movement. An overlap region of a movement route BSn with the area outside the permissible range of movement is also considered within the scope of the invention to be a conflict zone KZ that must be avoided by transport units TEn on the movement path BPn.

If at least one conflict zone KZ has been found, this information can be further processed by either providing it to the user, e.g., in a graphical or text output of a planning tool for the planar motor 1, which planning tool can be used to optimize the transport and processing process, or using the information to improve—preferably, fully automatically—the process flow of the transport task carried out with the planar motor 1, for example, intervening in the control of the movements of the transport units TEn.

Therefore, in an aspect of the invention, for collision avoidance and as the next step after the at least one conflict zone KZ is determined, at least one of the movement routes BSn involved in a found conflict zone KZ is replanned in order to reduce, and preferably completely eliminate, a found conflict zone KZ, and/or to reduce the number of conflict zones found, and preferably eliminate all conflict zones. At least one movement route BSn can also be replanned such that the complexity of conflict zones KZn is reduced by reducing the number of movement routes BSn involved in a conflict zone KZ. An increase in the distance between two conflict zones KZn can also be provided.

A movement route BSn can, for example, be replanned by virtue of the fact that a movement path BPn of a movement route BSR involved in the conflict zone KZ is replanned, at least in sections, and preferably in the region of the conflict zone KZ, in the movement plane 3 (i.e., the geometry of the movement path BPn is changed), and/or a width Bn of a movement route BSn is changed, at least in sections, preferably in the region of a conflict zone KZ. A width Bn of a movement route BSn can be changed, for example, by reducing or increasing a safety distance or by arranging an object O differently on the transport unit TEn, or by a restriction with respect to the possible objects O that can be transported along a movement path BPn.

This replanning of the at least one movement route BSn involved in a conflict zone KZ is preferably carried out in a fully-automated manner on the basis of prespecified rules for the replanning by corresponding software—for example, in a planning tool for the planar motor 1 or also in the control unit 10. Therefore, rules can be prespecified for the replanning on the basis of which a movement path BPn is changed, e.g., rules regarding how a movement path BPn in the movement plane 3 is to be displaced in sections and with which geometry of the movement path BPn this is to be carried out or how a geometry of the movement path BPn is to be changed.

However, it is also conceivable to carry out the replanning of the at least one movement route BSn involved in a conflict zone KZ by optimization. A cost function can be defined for the optimization that is a function of the geometry of the movement paths BPn or movement routes Bn involved in a conflict zone and/or a conflict zone KZ. In the cost function, a cost term can be included that evaluates the extent of a conflict zone KZ—for example, an area of a conflict zone KZ or a maximum length and width (based upon the movement path) of the conflict zone KZ. In the cost function, it is also possible for a cost term to be contained that evaluates the length of the movement paths BPn or movement routes BSn involved in a conflict zone in the direction of movement. A cost term can also evaluate the number of conflict zones KZ. Such cost terms are weighted in the cost function in a prespecifiable manner (e.g., with a value between 0 and 1), and added. The cost function is then optimized, usually minimized or maximized, by varying the geometry of the movement paths BPn or movement routes Bn involved in a conflict zone KZ. The movement paths BPn or movement routes BSn that optimize the cost function are then used for the replanning.

After the replanning of the at least one movement route BSn, the planar motor 1 can then be put into operation with the transport units TEn, which are moved in a defined manner along the intended movement paths BPn, or it can be switched to the newly determined configuration (if replanning takes place during operation).

Analogously to automated replanning, a movement route BSn can also be replanned manually by a user. For this purpose, the user can use the above-mentioned planning tool in order to carry out the replanning manually and thereby also achieve an improved process flow. For this purpose, the planning tool supplies information about the existence of conflict zones KZ (which are automatically determined as described above), and preferably their position. The position can be output, for example, via a representative point, such as the intersection of the movement paths BPn or the center point of the conflict zone area. In addition, the knowledge of the size of the area of the conflict zones KZ, the movement paths BPn or movement routes BSn involved in a conflict zone, the intersection points or points of approach thereof, and the projections of said points onto the movement paths BPn involved offers additional benefit.

Of course, a combination of manual replanning with automated replanning is also possible by virtue of the user being able to decide, e.g., interactively, for each determined conflict zone KZ whether there is a need to find a better solution for replanning for said determined conflict zone than the one automatically determined.

If a conflict zone KZ can be completely eliminated, a collision can no longer occur at the location where the conflict zone KZ was between transport units TEn on different movement paths BPn that were involved in the eliminated conflict zone or with obstacles H in the movement plane 3, as a result of which the collision monitoring in the control unit 10 can be simplified. In this case, it can essentially be sufficient to check a collision between directly adjacent transport units TEn along their movement paths BPn in their direction of movement along the respective movement path BPn. This can easily take place in a one-dimensional view, without having to take into account a two-dimensional (or spatial) extent of the transport units TEn in the movement plane 3. Such one-dimensional collision monitoring can be realized with very little computational effort, because a collision must be checked only in one direction.

By contrast, two-dimensional collision monitoring, i.e., substantially two-dimensional checking for a collision in all directions in the movement plane 3, is considerably more complex and requires considerably more computing power than one-dimensional collision monitoring—in particular, also because, for collision monitoring, transport units TEn on different movement paths BPn must also be checked for collisions.

In a further aspect of the invention, the use of movement routes BSn, as described above, for determining conflict zones KZ of possible collisions can thus also be used for an advantageous embodiment of the collision monitoring of a planar motor 1. Based upon the movement routes BSn and determined conflict zones KZ, there can be only two types of collisions. One type occurs within a movement route BSn outside a conflict zone KZ and only between transport units TEn traveling one behind the other in the movement route BSn. In contrast, in a conflict zone KZ, collisions between transport units TEn moving on different movement paths BPn or collisions of a transport unit TEn with an obstacle H are conceivable.

Therefore, the collision monitoring of the planar motor 1 can be designed such that, on a movement path BPn, but outside a conflict zone KZ, only one-dimensional collision monitoring is implemented in the direction of movement between transport units TEn traveling behind one another on the movement path BPn. As a result of the previous check for conflict zones KZ between movement routes BSn or between a movement route BSn and an obstacle H, it is consequently possible to rule out that other than transport units TEn traveling behind one another could collide outside a conflict zone KZ. In a conflict zone, two-dimensional, collision monitoring is implemented that checks, for a transport unit TEn moving in a movement route BSn involved in the conflict zone KZ and in the conflict zone KZ, whether there is a risk of collision with another transport unit TEn moving in a movement route Ian involved in the conflict zone KZ or with an obstacle H. In this way, however, collision, monitoring is also simplified, within the conflict zone KZ, with respect to classical approaches by limiting the quantity of the transport units TEn to be checked to those which are located on the movement route BSn involved in the conflict zone KZ in a local environment of the conflict zone KZ.

It is also evident from this that reduction in the size of a conflict zone KZ or an increase in the distance between two conflict zones KZ has a positive effect on collision monitoring, because this restricts the regions in which two-dimensional collision monitoring is required or the quantity of transport units TEn to be checked.

An advantageous method for operating a planar motor having a movement plane, in which at least two movement paths are prespecified, along which a plurality of transport units move, can thus be implemented. In this method, each movement path in the movement plane is expanded two-dimensionally, at least in sections, around the movement path to form a movement route in the movement plane by prespecifying a width of the movement route, at least in sections, at each point of the movement paths. With the resulting movement routes, a check is performed to determine whether the two resulting movement routes overlap or whether one of the resulting movement routes overlaps itself, or whether one of the resulting movement paths overlaps with an obstacle in the movement plane defined with respect to its location and size, in order to determine a conflict zone in the overlap region. In the conflict zone, there is a risk of collision between transport units moving in the region of the conflict zones on movement routes involved in the conflict zone or a risk of collision between a transport unit moving on a movement route involved in the conflict zone and an obstacle in the movement plane. On a movement path outside the determined conflict zone, one-dimensional collision monitoring is used during operation of the planar motor, which one-dimensional collision monitoring checks in the movement direction whether there is a risk of a collision between two transport units traveling behind one another on the movement path. In the conflict zone determined, two-dimensional collision monitoring is used, which checks in all directions in the movement plane 3 whether there is a risk in the conflict zone that a transport unit moving in a movement route involved in the conflict zone will collide with a transport unit moving in another movement route involved in the conflict zone or with an obstacle in the movement plane 3.

An entry logic for a conflict zone KZ can also be implemented in the control unit 10. It is thus possible to control which transport unit TEn is allowed to enter a conflict zone KZ first or at all when one or more transport units TEn would like to drive into a conflict zone KZ at the same time. This entry logic is independent of collision monitoring. In a preferred embodiment, the conflict zone KZ may be entered by a transport unit TEn only when it can be ensured that the transport unit TEn can leave the conflict zone KZ again in a collision-free manner—for example, that no other transport unit TEn is located in the conflict zone, and no backlog forms or no deadlock is produced as a result.

The entry logic preferably also takes into account the prioritization of the transport units TEn. The prioritization of the transport units TEn can be configured, for example, in the control unit 10. However, it can also be provided that the priority of the transport units TEn be derived from the priority of the movement paths BPn involved in the conflict zone KZ, such that individual movement paths BPn can be granted priority. For this purpose, the priority of the movement paths BPn can be configured. However, the prioritization of the transport units TEn can also be based upon other known principles for optimizing the process flow. For example, it is possible to use a ticket system (for example, a first-come-first-serve principle, a timed traffic light control system, or a throughput ratio between movement paths BPn), optimization with regard to the waiting time of the transport units TEn, or a system that prefers those movement paths BPn on which more transport units TEn are waiting. A combination of different mentioned prioritizations is also possible.

Of course, it is also conceivable to combine the embodiment of collision avoidance according to the invention with existing approaches. In this case, the aforementioned one-dimensional or two-dimensional collision monitoring can be used within the movement routes BSn and the conflict zones KZ, and, in those regions in which no movement route BSn is defined, conventional, known approaches are used, or collision monitoring is dispensed with. Thus, for example, the necessary flexibility can be attained within a processing station arranged along a movement path BPn.

For collision avoidance, it is advantageous if any entry into a movement route BSn by a transport unit TEn is generally prevented. For this purpose, a movement route BSn can be seen as a logical limitation of the permissible range of movement—for example, analogously to the edges of the transport segments 2. Entry into a movement route BSn by a transport unit TEn can be permitted at selected and prespecified positions, and preferably at the beginning of the movement path BPn or on selected, prespecified transition points along the movement path BPn. Preferably, a movement route BSn can only be entered by a transport unit TEn at the selected position when collision-free entry with respect to all transport units TEn assigned to the movement route BSn is possible.

As mentioned above, the movement paths BPn and the movement routes BSn dependent thereon are usually determined in advance, but at least only when a movement path BPn is replanned (also only in sections) and reconfiguration is thus necessary.

After a fault behavior by the planar motor 1, in which the transport units TEn slow down, for example, in uncontrolled fashion and thus assume an uncontrolled end position in the movement plane 3 after slowing down, or when the planar motor 1 is started up after a system stoppage, it may happen that a transport unit TEn is adjacent to, partially on a movement route Bn or completely or partially on a different movement route BSn than intended, or is completely outside all movement routes. "Partially" on a movement route BSn means that a transport unit TEn is not entirely within the associated movement route BSn, but only partially.

In this case, the following situations earl occur, for example. Although the transport unit TEn is not adjacent to a movement route BSn, it is on or partially on an incorrect movement route BSn. The transport unit TEn is partially on the movement route BSn and partially outside the movement route BSn. The transport unit TEn is partially on several movement routes BSn. The transport unit TEn is entirely outside the movement route BSn.

Before proper operation of the planar motor 1, it is therefore advantageous to restore a defined state, which can be carried out, for example, by the control unit 10. For the collision avoidance described above, it is assumed that such a defined state is present. The following explains how to achieve such a defined state.

For proper operation of the planar motor 1, it is necessary that no transport unit TEn partially project into a movement route BSn to which it is not assigned. Otherwise, the above-described advantageous method of one-dimensional collision monitoring can fail on a movement route BSn outside of conflict zones KZ. If one-dimensional collision monitoring is not provided, this would not be absolutely necessary, but nevertheless useful.

In order to restore a defined state of the planar motor 1, the transport units TEn (at least those which are located within or partially within a movement route BSn) are first to be assigned to a movement path BPn or a movement route BSn. In this case, assignment to the last known movement path BPn of a transport unit TEn can be carried out. However, assignment with respect to a predefined initial movement path BPn, which is prespecified by the user, for example, can also be carried out. However, assignment to the locally closest movement path BPn can also be carried out.

During proper operation, all transport units TEn assigned to a movement route BSn are preferably located completely on the movement route BSn, and thus do not protrude from the assigned movement route BSn. For the restoration of proper operation, those transport units TEn which are not located completely on the assigned movement route BSR (i.e., at least partially protrude therefrom) are to be transferred to the assigned movement route BSn by a restoration movement. For this purpose, temporary restoration paths or restoration routes can be defined along which such transport units move in order to be transferred. The starting point of such a temporary restoration path is the current position of the transport unit TEn, and the end point is a point in the movement route BSn into which the transport unit TEn is to be transferred. The term, "temporary," is used, because these temporary restoration paths or restoration routes are no longer needed after the defined state is established. This temporary state may be considered to be a separate mode of restoration, but preferably also follows the method described herein, in that the restoration routes are treated in the same way as the movement routes BSn.

The restoration process can take place by manually inputting a sequence of movement commands, but is preferably carried out fully automatically by the control unit 10, without the user having to intervene.

In the course of such automatic restoration, at least temporary addition of restoration paths or restoration routes is necessary, such that corresponding restoration conflict zones can result that can be treated as described above with respect to control of the movements of the transport units TEn and collision monitoring. The restoration paths can either be selected in such a way that they enter into the intended movement routes BSn at any points or at prespecified points. When creating the restoration paths, care should preferably be taken to ensure that restoration conflict zones arise only at the entry points of the movement routes BSn, but not along the restoration paths. Once the restoration process is complete, the restoration routes can be discarded again.

In order to ensure that the transport units TEn enter the assigned movement routes BSn with as little conflict as possible and avoid deadlock situations as far as possible hi the process, it may also be useful to enter the assigned movement path BPn in a defined sequence, i.e., to determine the sequence in which the transport units TEn assume their position on the movement path BPn. This can take place, for example, by first restoring the transport units TEn whose distance with respect to the orthogonal projection onto the intended entry point of the movement path BPn or movement route BSn is shorter and, if necessary, by creating space for subsequent transport units TEn by movement along the movement path BPn. The distance can be determined, for example, with respect to a reference point RP or also with respect to any other point (e.g., extreme point) on the transport unit TEn. However, the spacing can also be determined by a different metric than the orthogonal projection, e.g., the shortest distance in a certain direction of the movement plane 3, such as the x-direction of the planar motor orientation or the length of the respective restoration path.

If the assignment and preferably also the assignment sequence, and optionally also the sequence of the transport units TEn in the direction of movement on the movement path BPn, has been defined, the transport units TEn are moved to the assigned movement path BPn, i.e., for example, the respective reference point is positioned on the movement path BPn—optionally, in the determined sequence. If desired, the sequence along the movement path BPn can also be adapted in this step by moving the transport units TEn already arranged in sequence.

The transport units TEn are then moved to the respective movement path BPn along the restoration paths, which were preferably created analogously to the metric used for the assignment sequence. Of course, it should be ensured in this case that no collisions occur between transport units TEn.

Transport units TEn having a lower assignment priority, which defines the assignment sequence, preferably have a lower priority than transport units TEn of a higher assignment priority. The assignment priority can be prespecified or set for each transport unit TEn. This is advantageous if not all transport units TEn assigned to a movement path BPn can be positioned in a collision-free manner on the movement route BSn. Preferably, a movement route BSn may only be entered by a transport unit TEn if movement to the respective movement path BPn can take place in a conflict-free manner.

In embodiments, any or all of the control unit, the coil control units, the system control unit, and the segment control unit can be implemented digitally, e.g., as software on microprocessor-based hardware. Thus, these units can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies, and/or analog instrumentation, e.g., analog electric/electronic circuits, analog computers, analog devices, etc. Further, the processing of the signals in these units can be implemented by microprocessors or similar components, programmed using software (e.g., microcode) to perform various functions discussed heroin and may optionally be driven by firmware and/or software. Alternatively, these units may be implemented by dedicated hardware, or as a combination of dedicated hardware to perform some functions and a processor (e.g., one or more programmed microprocessors and associated circuitry) to perform other functions.

Moreover, at least one memory (not shown), e.g., a non-transitory computer readable medium or media, can be provided an accessible by any or all of control unit, the coil control units, the system control unit, and the segment control unit to store one or more sots of instructions to perform any of the methods or computer-based control functions disclosed herein, either alone or in combination with the other described devices. These units can also include at least one processor that can access the at least one memory to execute the one or more sets of instructions to perform any of the methods or computer-based functions discussed above. Moreover, the at least one memory can be part of the slave or can be remote from the slave, e.g., a remotely located server, memory, system, or communication network or in a cloud environment, and the at least one processor can also part of the slave or remote from the slave.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for operating a planar motor having a movement plane in which a plurality of movement paths is prespecified and a plurality of transport units move along the plurality of movement paths, comprising:
    forming at least two movement routes for at least two movement paths of the plurality of movement paths in the movement plane by two-dimensionally expanding the at least two movement paths, at least in sections, and prespecifying, at least in sections of the two-dimensionally expanded at least two movement routes, widths at each point of the two-dimensionally expanded at least two movement paths;
    determining at least one conflict zone in an overlap region at least one of:
        between the at least two movement routes,
        where at least one of the at least two movement routes overlaps with itself, or
        where at least one of the at least two movement routes overlaps with an obstacle in the movement plane, in which the obstacle is defined by a location and geometry in the movement plane,
    in which there is a risk of collision between transport units moving in a region of the at least one conflict zone in the at least one overlap region or a risk of collision between transport units and the obstacle in the movement plane in a region of the at least one conflict zone where the at least one of the at least two movement routes overlaps with the obstacle in the movement plane; and
    based on the determined at least one conflict zone, controlling movement of the transport units along the at least two movement paths to avoid collisions between the transport units or between the transport units and the obstacle when the transport units move in the at least one conflict zone.

2. The method according to claim 1, wherein the width of at least one movement route in the movement plane is prespecified orthogonally to an assigned movement path.

3. The method according to claim 1, wherein the width of at least one movement route in the movement plane is prespecified asymmetrically to the movement path, at least in sections.

4. The method according to claim 1, further comprising determining a reference point on a transport unit moving on at least one of the at least two movement paths, and the at least one of the at least two movement paths is related to the reference point.

5. The method according to claim 4, further comprising determining vectors from the reference point to an outer contour of the transport unit in the movement plane at a position of the movement path on both sides of the transport unit as viewed in the direction of movement of the transport unit,
    wherein the determined vectors are in each case projected onto a normal on the movement path at this position, and
    wherein a longest projection on each side of the transport unit are added to the width of the movement route at this position.

6. The method according to claim 5, wherein a prespecified geometric figure, which surrounds the transport unit in the movement plane, is used as the outer contour.

7. The method according to claim 1, wherein the controlling of the movement of the transport units along an assigned movement path, based on the determined conflict zone, comprises, for collision avoidance, replanning at least one of the movement routes involved in the conflict zone, at least in sections, in order to at least one of:
- eliminate the conflict zone,
- reduce a size of the determined conflict zone,
- reduce a number of determined conflict zones, or
- reduce the number of movement routes involved in the conflict zone, or
- increase a distance between two conflict zones.

8. The method according to claim 7, wherein the replanning of the at least one of the movement routes includes at least one of replanning the assigned movement path, at least in sections, or changing a width of the at least one of the movement routes, at least in sections.

9. The method according to claim 1, wherein the controlling of the movement of the transport units along the at least two movement paths, based on the determined at least one conflict zone, comprises two-dimensional collision monitoring for collision avoidance in the at least one conflict zone,
- wherein the two-dimensional collision monitoring checks whether there is a risk that a transport unit moving in a movement route including the at least one conflict zone will collide with another transport unit moving in another movement route including the at least conflict zone or with an obstacle in the movement plane.

10. The method according to claim 1, wherein the controlling of the movement of the transport units along the at least two movement paths, based on the determined at least one conflict zone, comprises, one-dimensional collision monitoring on a portion of the at least two movement paths outside of a region of the at least one conflict zone,
- wherein the one-dimensional collision monitoring checks in a movement direction whether there is a risk of a collision between two transport units traveling one behind the other on the portion of the at least two movement paths outside of the region of the at least one conflict zone.

11. The method according to claim 1, wherein the controlling of the movement of the transport units along the at least two movement path, based on the determined at least one conflict zone, comprises checking, before a transport unit moving on a movement route including the at least one conflict zone enters the conflict zone, whether said transport unit can exit the conflict zone with the intended movement without colliding with another transport unit moving on a different movement route including the at least one conflict zone,
- wherein, in a negative case, entry is denied.

12. The method according to claim 1, wherein the controlling of the movement of the transport units along the at least two movement path, based on the determined at least one, comprises assigning a priority to transport units, and a transport unit having the highest priority is granted entry into a conflict zone first.

* * * * *